(12) United States Patent
Florencio et al.

(10) Patent No.: US 11,093,740 B2
(45) Date of Patent: Aug. 17, 2021

(54) SUPERVISED OCR TRAINING FOR CUSTOM FORMS

(71) Applicant: Microsoft Technology Licensing, LLC, Redmond, WA (US)

(72) Inventors: Dinei Afonso Ferreira Florencio, Redmond, WA (US); Cha Zhang, Bellevue, WA (US); Gil Moshe Nahmias, Seattle, WA (US); Yu-Yun Dai, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 174 days.

(21) Appl. No.: 16/185,737

(22) Filed: Nov. 9, 2018

(65) Prior Publication Data
US 2020/0151443 A1    May 14, 2020

(51) Int. Cl.
*G06K 9/00*      (2006.01)
*G06N 20/00*    (2019.01)
*G06K 9/62*      (2006.01)

(52) U.S. Cl.
CPC ....... *G06K 9/00449* (2013.01); *G06K 9/6256* (2013.01); *G06N 20/00* (2019.01); *G06K 2209/01* (2013.01)

(58) Field of Classification Search
CPC ...... G06F 40/30; G06F 40/284; G06F 40/211; G06F 40/279; G06F 40/295;
(Continued)

(56) References Cited

U.S. PATENT DOCUMENTS 6,665,666 B1 * 12/2003 Brown ................ G06F 16/3338
8,880,540 B1 * 11/2014 Sampson ........... G06K 9/00463
                                                        707/756
(Continued)

FOREIGN PATENT DOCUMENTS

JP      H07200726 A      8/1995

OTHER PUBLICATIONS

Consul, Learning how to Extract Information from Scanned Documents, Sep. 2017 [retrieved Mar. 26, 2021], Thesis, Massachusetts Institute of Technology, 62 pages. Retrieved: https://dspace.mit.edu/handle/1721.1/119515 (Year: 2017).*

(Continued)

*Primary Examiner* — Matthew C Bella
*Assistant Examiner* — Dennis Rosario
(74) *Attorney, Agent, or Firm* — Davin Chin; Chin IP, PLLC

(57) ABSTRACT

The disclosed technology is generally directed to optical character recognition for forms. In one example of the technology, optical character recognition is performed on a plurality of forms. The forms of the plurality of forms include at least one type of form. Anchors are determined for the forms, including corresponding anchors for each type of form of the plurality of forms. Feature rules are determined, including corresponding feature rules for each type of form of the plurality of forms. Features and labels are determined for each form of the plurality of forms. A training model is generated based on a ground truth that includes a plurality of key-value pairs corresponding to the plurality of forms, and further based on the determined features and labels for the plurality of forms.

20 Claims, 6 Drawing Sheets

(58) Field of Classification Search
CPC ...... G06F 16/951; G06N 20/00; G06N 5/025;
G06N 3/08; G06K 2209/01; G06K
9/00469; G06K 9/46; G06K 9/00442;
G06K 9/00463; G06K 9/00456; G06K
9/00483; G06K 9/00449
See application file for complete search history.

(56) References Cited

U.S. PATENT DOCUMENTS

| | | | | |
|---|---|---|---|---|
| 10,489,682 | B1* | 11/2019 | Kumar | G06K 9/38 |
| 2003/0152277 | A1* | 8/2003 | Hall, Jr. | G06K 9/00463 |
| | | | | 382/229 |
| 2007/0168382 | A1* | 7/2007 | Tillberg | G06K 9/00449 |
| 2008/0285860 | A1* | 11/2008 | Datta | G06K 9/4652 |
| | | | | 382/224 |
| 2015/0347861 | A1 | 12/2015 | Doepke et al. | |
| 2017/0098138 | A1* | 4/2017 | Wang | G06K 9/6828 |
| 2018/0033147 | A1 | 2/2018 | Becker et al. | |
| 2018/0157987 | A1* | 6/2018 | Schmidt-Karaca | G06Q 10/10 |
| 2018/0165546 | A1* | 6/2018 | Skans | G06K 9/6234 |
| 2018/0226066 | A1* | 8/2018 | Harris | G06N 20/00 |
| 2019/0172223 | A1* | 6/2019 | Vajda | G06K 9/4633 |
| 2019/0362452 | A1* | 11/2019 | Brunets | G06F 16/337 |
| 2019/0370696 | A1* | 12/2019 | Ezen Can | G06F 40/20 |
| 2020/0004873 | A1* | 1/2020 | Chang | G06F 16/313 |
| 2020/0005089 | A1* | 1/2020 | Guruprasad | G06N 20/00 |

OTHER PUBLICATIONS

Ferrara et al., Similarity Recognition in the Web of Data, Mar. 28, 2014 [retrieved Mar. 27, 2021], Workshop Proceedings of the EDBT/ICDT 2014 Joint Conference, pp. 263-268. Retrieved: http://citeseerx.ist.psu.edu/viewdoc/download?doi=10.1.1.429.341&rep=rep1&type=pdf (Year: 2014).*

Al-Hashim, Arabic Database for Automatic Printed Arabic Text Recognition Research and Benchmarking, Thesis, Jun. 2009 [ retrieved Apr. 2, 2021], King Fahd University of Petroleum & Minerals, 122 pages. Retrieved: https://eprints.kfupm.edu.sa/id/eprint/136140/ (Year: 2009).*

Constans, Pere, "A Simple Extraction Procedure for Bibliographical Author Field", In Repository of arxiv, arXiv:0902.0755v1, Feb. 4, 2009, 4 Pages.

"International Search Report and Written Opinion Issued in PCT Application No. PCT/US19/057509", dated Dec. 22, 2020, 20 Pages.

* cited by examiner

SUPERVISED OCR TRAINING FOR CUSTOM FORMS

BACKGROUND

Typically, many business processes still use forms and printed material, and conversion back to digital from can often be unreliable.

Optical character recognition (OCR) may be used to convert a document into text. However, OCR by itself does not determine which text corresponds to which fields. When performing OCR on forms and attempting to determine which text corresponds to which field, in order to achieve reliable results, it may typically be required that a specific location be provided for each field, and it may typically be required that a substantially uniform form be used, in order to make the determination.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to optical character recognition for forms. In one example of the technology, optical character recognition is performed on a plurality of forms. In some examples, the forms of the plurality of forms include at least one type of form. In some examples, anchors are determined for the forms, including corresponding anchors for each type of form of the plurality of forms. In some examples, feature rules are determined, including corresponding feature rules for each type of form of the plurality of forms. In some examples, features and labels are determined for each form of the plurality of forms. In some examples, a training model is generated based on a ground truth that includes a plurality of key-value pairs corresponding to the plurality of forms, and further based on the determined features and labels for the plurality of forms.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
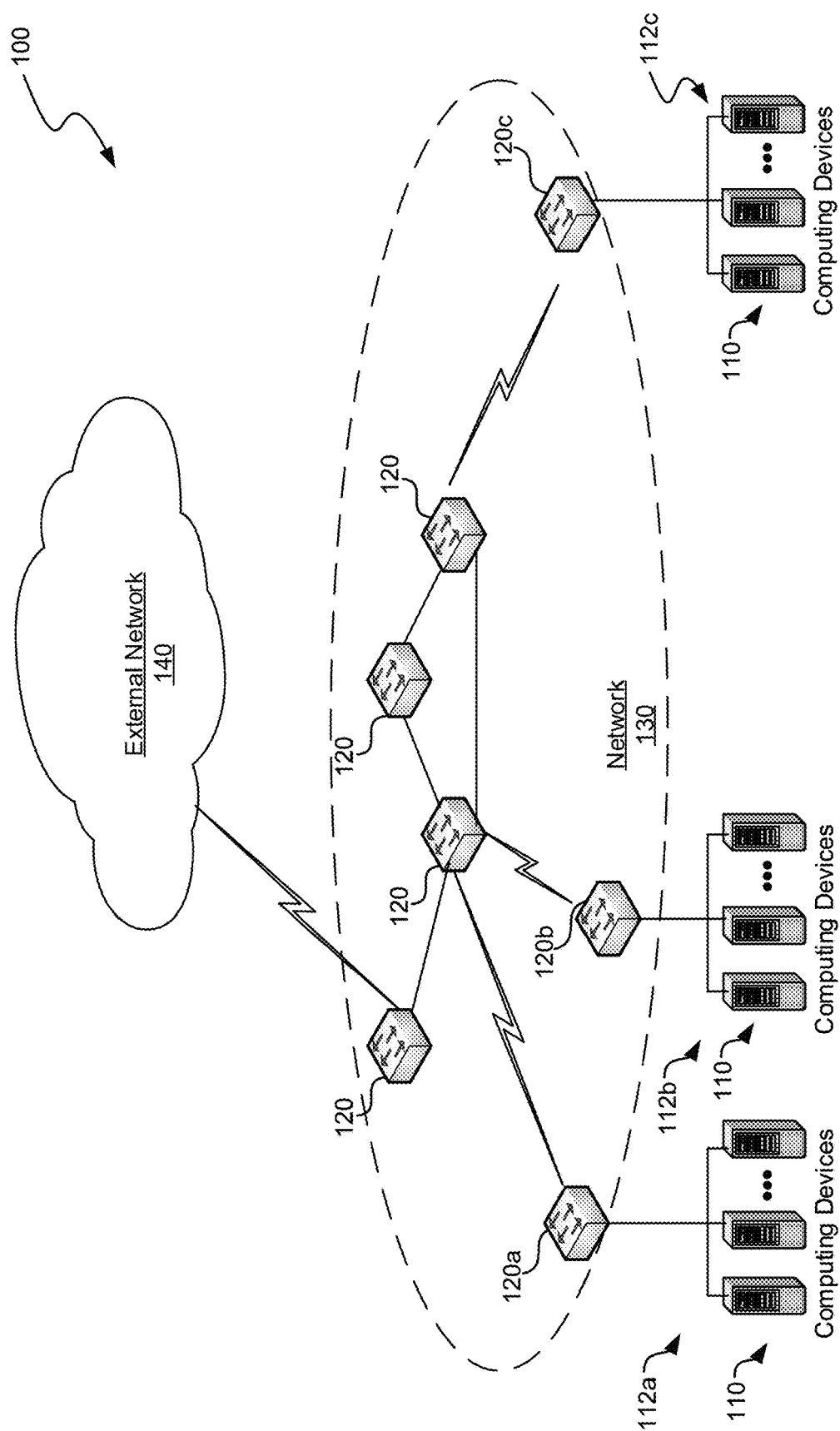
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to optical character recognition for forms. In one example of the technology, optical character recognition is performed on a plurality of forms. In some examples, the forms of the plurality of forms include at least one type of form. In some examples, anchors are determined for the forms, including corresponding anchors for each type of form of the plurality of forms. In some examples, feature rules are determined, including corresponding feature rules for each type of form of the plurality of forms. In some examples, features and labels are determined for each form of the plurality of forms. In some examples, a training model is generated based on a ground truth that includes a plurality of key-value pairs corresponding to the plurality of forms, and further based on the determined features and labels for the plurality of forms.

Training may be performed from custom forms so that future forms can be OCR'ed in such a way that key-value pairs are generated from the future forms. In some examples, the keys are elements for which users wish to know corresponding values based on the input form. For instance, an example key might be "customer name" and the corresponding value might be "John Smith." As another example, an example key might be "invoice date" and the corresponding value might be "5/7/18." As another example, an example key might be "balance due" and the corresponding value might be "$984.96."

The training may be accomplished with a set of forms that includes types of forms that may be processed in the future, along with a ground truth that includes the correct key-value pair for each form. The training process may output a model based on machine learning, and may also output other elements such as a language model, extraction rules, anchors for one or more types of forms, and/or feature rules. The model and other elements output by the training process may be used to perform OCR on such forms in the future and generate key-value pairs for these forms where the key-value pairs are not known in advance.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices no shown in FIG. 1 may be in various locations, including on premise, in the cloud, or the like. For example, computer devices no may be on the client side, on the server side, or the like.

As shown in FIG. 1, network 130 can include one or more network nodes 120 that interconnect multiple computing devices no, and connect computing devices no to external network 140, e.g., the Internet or an intranet. For example, network nodes 120 may include switches, routers, hubs, network controllers, or other network elements. In certain examples, computing devices no can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices no may be virtually any type of general-or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

Figure 4:
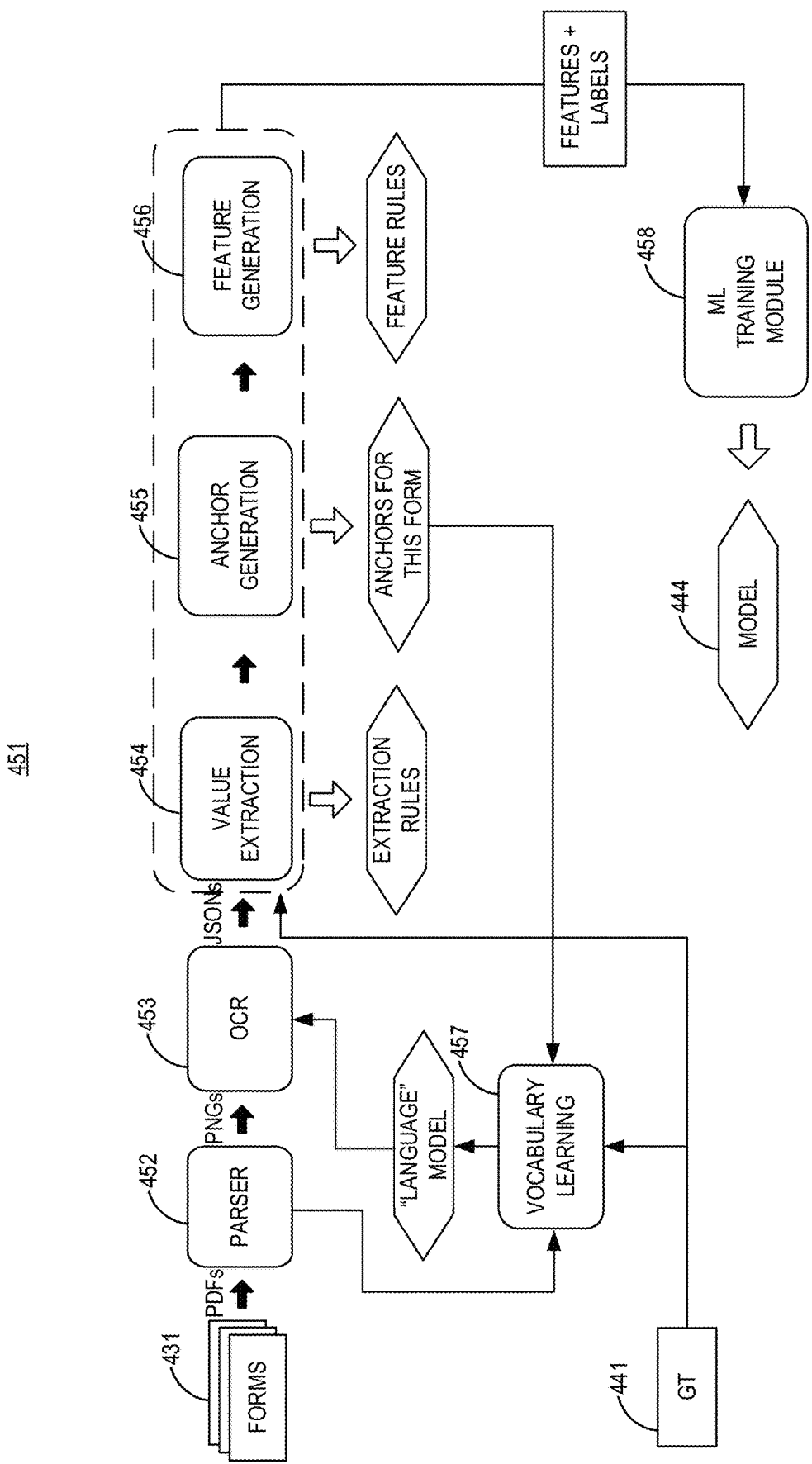
FIG. 4 is a functional block diagram illustrating an example training pipeline.
Figure 5:
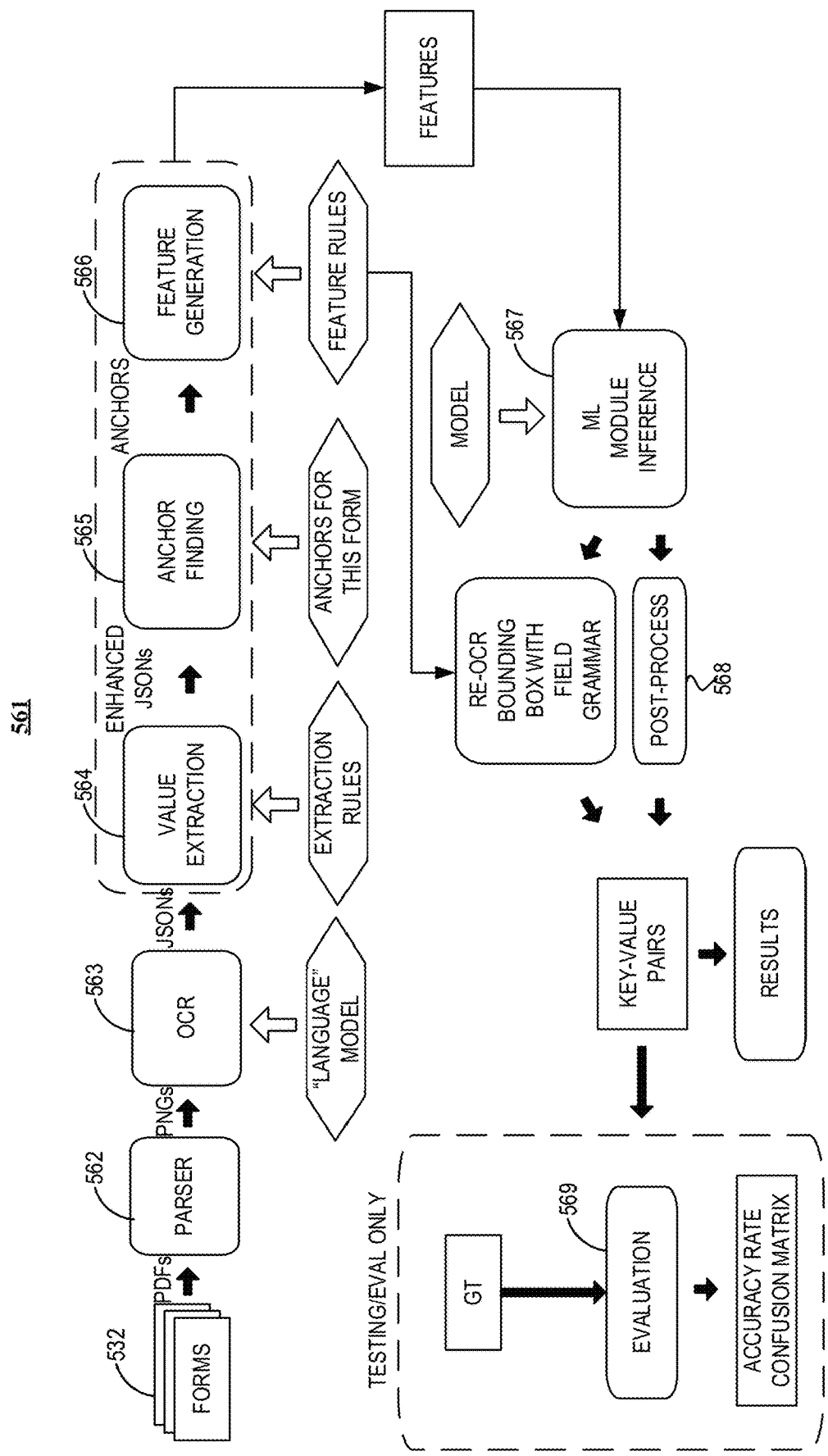
FIG. 5 is a functional block diagram illustrating an example testing/service pipeline.

In some examples, one or more of the computing devices 110 is may perform one or more of the processes as illustrated in FIG. 4, FIG. 5, and/or FIG. 6, as discussed in greater detail below.

Illustrative Computing Device

Figure 2:
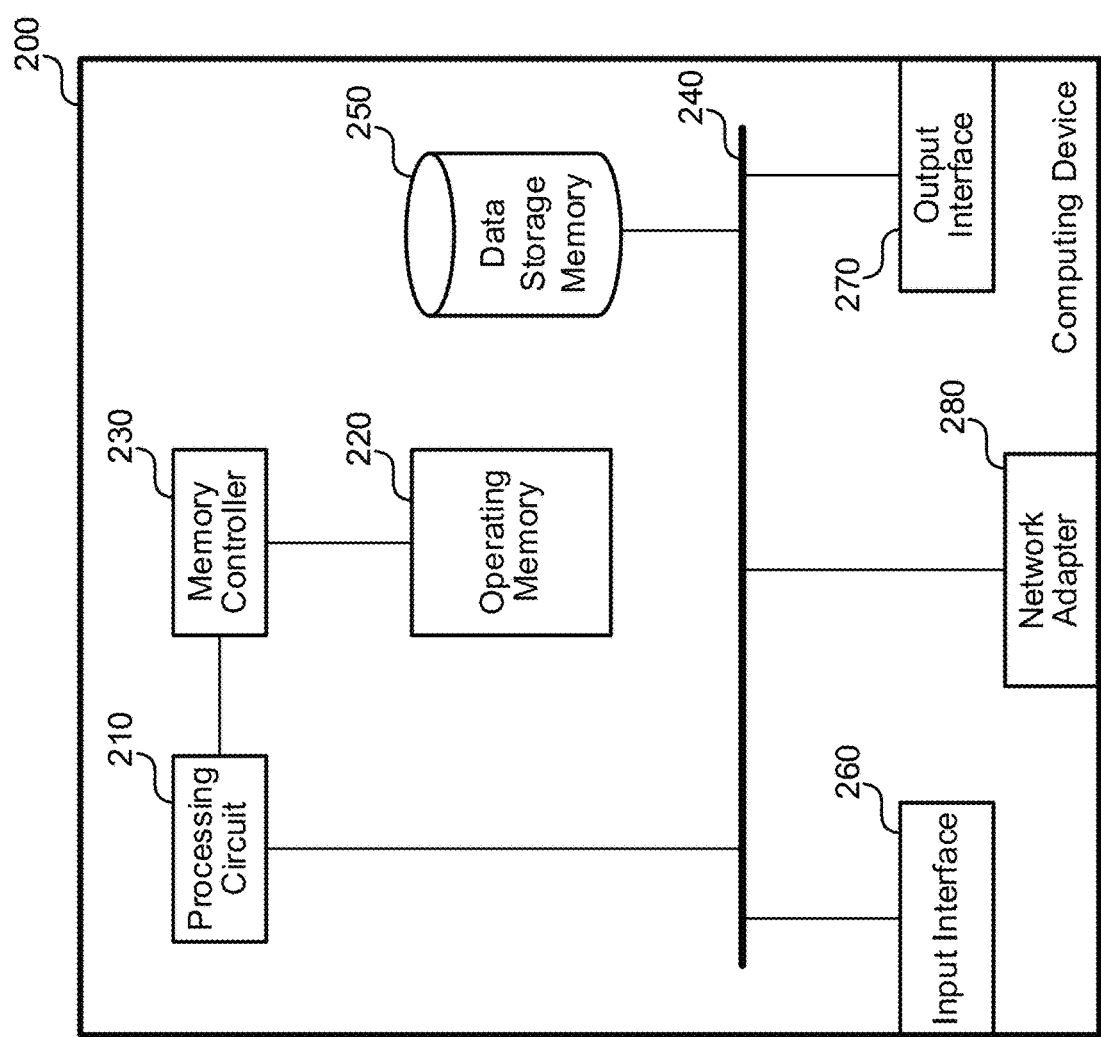
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device no or network node 120 of FIG. 1. Likewise, computer device 200 may be an example any of the devices illustrated in or referred to in FIGS. 3-5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. Processing circuit 210 is an example of a core. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process. In some examples, other forms of execution may be employed, such as execution directly from data storage component 250, e.g., eXecute In Place (XIP).

Operating memory 220 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 210 via memory controller 230 in channels. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter ("UART"), a Serial Peripheral Interface ("SPI"), Inter-Integrated Circuit ("I2C"), a General-purpose input/output (GPIO), and/or the like. Moreover, input interface 260 and/or output interface 270 may include or be interfaced to any number or type of peripherals. In some examples, one or more input interfaces 260 may be used to directly connect to imaging devices. For example, computing device 200 may be connected to a camera, scanner, or other imaging device. Computing device 200 may also receive images from other computing devices.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, SigFox, LoRa, Powerline, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions, such as, for examples, one or more of the processes discussed in greater detail below.

Illustrative System

Figure 3:
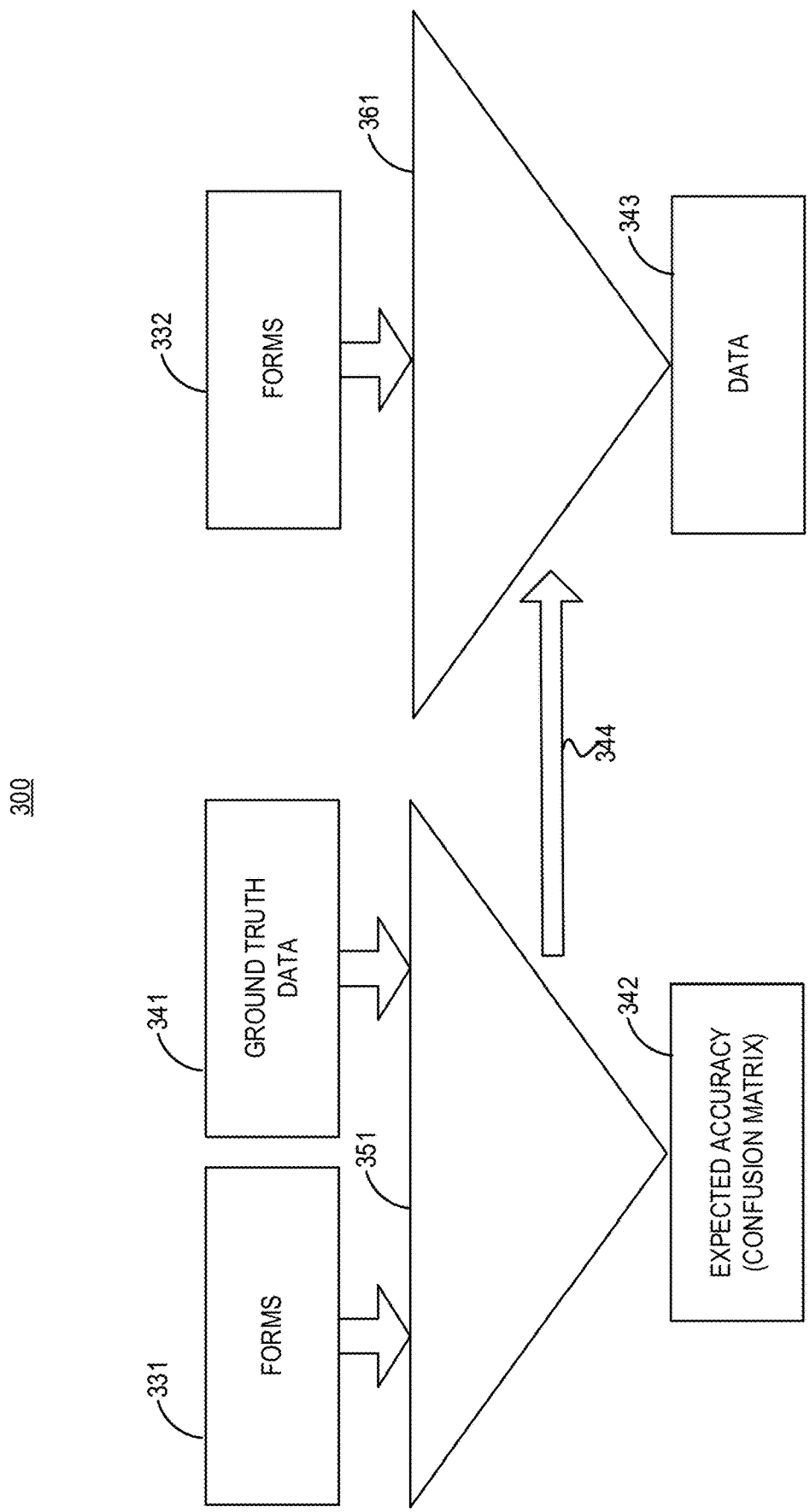
FIG. 3 is a functional block diagram illustrating an example of a system.

FIG. 3 is a functional block diagram of an example system 300. System 300 may include forms 331, forms 332, ground truth data 341, expected accuracy data 342, key-value data 343, model 344, training pipeline 351, and service pipeline 361.

System 300 may be used to perform OCR on forms for which the user wishes to also know the values of particular keys as part of the output of the OCR process. For example, forms may include customer name, and for such forms, the user may wish to know what customer name is indicated on a particular form, and so output "customer name," the key, along with the corresponding value for the customer name indicated on the form. There may be several such key-value pairs in each form that users wish to be output by the OCR process. In some examples, the key-value pairs are presented in a hierarchical form, such as one or more tables.

In some examples, forms 332 are forms for which the OCR process is to be performed along with key-value determinations made. In some examples, forms 331 may be past forms of the same type or types as forms 332, such as forms from a previous quarter, a previous year, or the like.

The training process may make use of forms 331, which may include forms of one or more types with which the user may wish to, in the future, OCR forms of the same one or more types along with output key-value pairs. Training pipeline 351 may perform training based on forms 331, along with ground truth data 341. In some examples, ground truth data 341 includes, for each of the forms in 331, all of the correct key-value pairs for the form.

Training pipeline 351 may output model 344 and expected accuracy data 342 based on the training. In some examples, model 344 may include a machine learning model for generating key-value pairs from features derived from an input form, and may also include a language model, extraction rules, anchors for one or more forms from among forms 331, and feature rules. Expected accuracy data 342 may include information about the expected accuracy of model 344 in deriving key-value pairs from forms 332, including, in some examples, a confusion matrix.

In some examples, forms 332 are forms to be processed once the training is complete, to perform OCR along with outputting the key-value pairs. After the training is accomplished, service pipeline 361 may be used to perform OCR on forms 332, along with predicting the desired key-values pairs, as key-value data 343, based on model 344.

FIG. 4 is a functional diagram illustrating an example training pipeline (451), which may be employed as an example of training pipeline 351 of FIG. 3. Training pipeline 451 may include Parsing block 452, OCR block 453, value extraction block 454, anchor generation block 455, feature generation block 456, vocabulary learning block 457, and machine-learning training module 458.

Parsing block 452 may be configured to receive forms 431 and to parse forms 431. Forms 431 may be formatted as portable documents, for example, in Portable Document Format (PDF), and/or the like. The output of parsing block 452 may be in a raster graphics file format, such as Portable Network Graphics (PNG), or in another suitable format. OCR block 453 may be configured to perform optical character recognition on the output of parsing block 452. OCR block 453 may also output the locations of visual elements not traditional classified as text. This may include lines, checkboxes, location of logos or images, and other image elements. OCR block 453 may output the forms as documents that include a text format, such as JavaScriptObjectNotation (JSON) or another suitable format.

Value extraction block 454 may receive Ground Truth 441 and the output of OCR block 453, and modify the documents to include line breaks. Value extraction block 454 may also generate extraction rules from the forms that value extraction block 454 processes. The extraction rules may include rules for adding line breaks to the data.

In some examples, learning line breaks from the data includes, given the training data, finding break points that separate keys from values. That is, in these examples, value extraction block 454 separates the data into lines. A line may have one word, or may have more than one word. In some examples, this is accomplished by first finding the "values" in the text of the form, as indicated as such according to the Ground Truth 441. A list called, for example, List A may be generated, and text previous to the determined values may be added to list A. Next, in some examples, for each element in List A, the element is removed from List A if the element contains any GT "values" other than at end of GT value (this would break those values into two fields). Next, in some examples, List A is used to split lines into two lines (fields).

Anchor generation block 455 may receive the document with lines breaks added from value extraction block 454, and may determine anchors for the particular type of form according to the current form. Anchors, in these examples, are fields that would appear in the empty form for the current form. For example, a form may have been filled out from an empty form, where the empty form is the version of the form that exists before the form is filled out. Even if the empty form itself it not accessible, it may be possible to determine or approximately determine the empty form based on, among other things, the intersection of several forms of the same type. The fields present in the determined empty form are defined as anchors.

In addition to determining lines that are anchors, anchor generation block 455 may also determine other kinds of anchors, including other visuals cues, such as, for example, visual features, tables corners, and/or the like.

Forms 431 may include different types of forms in different examples. In some examples, forms 431 are all forms of the same type. In some examples, forms 431 may include multiple different types of forms, possibly with outliers, but with most forms belonging to one of several types of forms of which multiple instances of each type of form are included. Other combinations of types of forms may be included in forms 431 in various examples. In some examples, form clustering may be used to separate the forms into separate times of forms. In some examples, rather than using form clusters, the type of form may be an input parameter by the user.

In some examples, one or more empty forms may be included in forms 431 and specifically designated as empty forms. In this case, the empty form may be used to determine anchors. If specifically designated empty forms are not present, the anchor generation may in essence determine the empty forms, based on the ground truth and on analysis of similarities between forms which are of the same or a similar type. For example, as part of the anchor determination, a histogram may be used to determine which lines appear among the forms with reasonable frequency. Lines which appear among the forms with reasonable frequency, but which don't show up more than once per page, and are part of Ground Truth 441, may make good candidates for anchors.

Anchor generation block 455 may determine the anchors as follows in some examples. First, all values present in Ground Truth 441 are removed from the forms. Next, lines that occur more than once per page are removed. Next, a histogram of the remaining lines is completed. The lines are then scored based on frequency, with extra points given if a line is included in a set of "known good anchors," such as "date," "address," "DOB," "order number," "Customer," and/or the like. Next, based on this score, the top N anchors from all of the forms, are determined, where N is a number that is determined based on the histogram.

Determined anchors for the form generated by anchor generation block 455 may also be received by vocabulary learning block 457. Vocabulary learning block 457 may use the ground truth, the generated anchors, and outputs from Parser block 453 to generate a language model. The language model output from vocabulary learning block 457 may be used by OCR block 453 to provide more accurate OCR by acting as a model-tuned form of OCR. The adjustment may include adding or increasing in the language model for fields which are present in the anchors, for use on the whole form. Also, the OCR may be run with a field-specific language model and run on a specific bounding box where the field is expected to be. For example, a particular language model may be trained for dates, another for addresses, and another for names, and so on. Regular expressions may be run in the language model. In some examples, this may be specified via a Finite State Transducer Model and incorporated into the OCR language model. Regular expressions rules may be extrapolated from the forms in this manner.

Feature generation block 456 may receive the modified forms and generate feature rules based on the type of form, and also generate features and labels from the form. In some examples, the terms "feature" here is used in the machine learning sense, where a feature is an individual measurable property of the form. Features are the inputs of the machine learning in these examples. The type of features used as inputs to the machine learning may be important to effective machine learning. For example, it would be possible to just literally input each pixel as features, but that may not result in machine learning as effective as would be the case by using higher level features.

In some examples, learned features may include, among other things, features that may be helpful in locating desired fields.

In some examples, finding features that help locate desired fields may be accomplished as follows. First, a list of the Ground Truth values for a particular field for the form being trained is obtained. Next, it is determined whether the field has a limited vocabulary. For instance, if a field has less than 13 possible values, and each value shows up at least twice, this may be a good candidate for a "limited vocabulary field." In this case a feature of "is line in vocabulary" or "edit distance to make line match a vocabulary entry" may be included. For instance, in a particular field, the only valid values might be one of the twelve months of the year. Or, the only valid values might be one of the four months at the end of a quarter. Such values would likely make good candidates for limited vocabulary fields.

Next, it may be determined whether a particular word or line is in a fixed format. For instance, in some examples, feature generation block 456 converts all numbers to 9, and all letters to X, and all symbols to #. Next, in some examples, feature generation block 456 determines whether all (modified) values follow a few patterns—e.g., at most three patterns with at least 20 elements in each. If so, in some examples, feature generation block 456 uses a matching regular expression, and includes the matching regular expression as a feature. Additionally, feature generation block 456 may determine whether fields obey one or more additional patterns, such as every letter being a "W."

Next, feature generation block 456 may use features such as number of letters, number of digits, number of special characters, and/or the like. Features may include how many letters does the field have, does it have dots, commas, or parentheses, and/or the like. Other examples of features may include the location of anchor text, and/or the like. Features may include the determined lines and text of the lines, a determination as to whether the line is a value, key, and/or anchor, location of the text, and properties of the text itself that may be relevant such as text size, font, and/or the like.

So, an example feature rule could be: "does this line or word conform to a format of five characters, including two digits, followed by a letter, followed by two digits?", yes or no.

The determined features and feature rules are not themselves, in these examples, requirements for the fields. Rather, in these examples, the machine learning training module block 458 will later determine how important a particular feature is or is not.

Feature generation block 456 also determines labels for the lines in the form. For each line in the form, it is determined whether the line is a value, based on the ground truth and other factors discussed above. If the line is not a value, then the line is not assigned a label. If the line is a value, a determination is made as to the key corresponding to the value, based on the ground truth. If a key corresponding to the value is not found, a label is not assigned to the line. If a key corresponding to the value in the line is found, then the line is assigned the corresponding value as a label.

If multiple fields each have the same value that corresponds to a value that is present in the ground truth, this can be handled in different ways in different examples. In some examples, both labels are left unassigned. In some examples, both lines are assigned the same key. In some examples, the line is assigned the closest key.

Machine Learning Training Module block 458 may generate a key-value pair determination model 444 based upon the received features and labels. In some examples, Machine Learning Training Module block 458 may generate a key-value pair determination model 444 by directly using the vectors of features and labels to train a classifier, such as, for example, a random forest classifier, a decision tree, a neural network, a support vector machine, and/or another suitable classifier.

In some examples, Machine Learning Training Module block 458 may generate a key-value pair determination model 444 as follows. The most common words are selected as keywords, and the keyword coverage is verified and/or modified during the training. In some examples, forms that contain the "value" based on Ground Truth 441 are identified, and "value" and "keywords" from these matches as training. Then, features and machine learning may be selected as appropriate for identifying the particular key-value pair as indicated in Ground Truth 441.

Block 458 may determine, for example, that "zip code" is always a key. If, however, a line is encountered for which it is not known whether the line is a key or a value, factors such as font and size of the text may be used. If previous known keys have used a particular font size and type and begin at the same horizontal position, whereas previous known values have not, and a line has the same font size, font type, and begin at the same horizontal position as the previous known keys, then block 457 may determine that the line is likely a key, and if this is verified by the Ground Truth, this may be used as part of the model.

As an example, the machine learning may determine that the value for a particular key may typically be found to the upper left of that key in the form. However, it may determine that, for a particular type of form, based on particular features being present, it is instead that there is a likely a horizontal line above the key and that the value for the key is typically above that line in this type of form.

FIG. 5 is a functional block diagram illustrating an example testing/service pipeline (561), which may be employed as an example of testing/service pipeline 361 of FIG. 3. Testing/Service pipeline 561 may include Parse block 562, OCR block 563, value extraction block 564, anchor finding block 565, feature generation block 566, machine-learning module inference block 567, and post-processing block 568. For testing and/or evaluation purpose, evaluation block 569 may also be included in testing pipeline 561.

Testing/Service pipeline 561 may be used to OCR forms 532 and generate key-value pairs for the forms, based on the language model, extraction rules, extracted form anchors, and key-value pairing model obtained by training pipeline

551. In the service pipeline examples, this is done during regular operation on forms for which the key-value pairs are not known, but which are predicted by service pipeline 561. In the testing pipeline examples, there is a ground truth for the forms, which may be used by evaluation block 569 to evaluate the accuracy of the results.

Parsing block 562 may be configured to receive forms 532 and to parse forms 532. Forms 532 may be portable documents in a format such as PDF format, and/or the like. The output of parsing block 562 may be in a raster graphics file format, such as PNG, or in another suitable format. OCR block 563 may be configured to perform optical character recognition on the output of parsing block 562. OCR block 563 may perform OCR based, in part, upon the input Language Model. OCR block 563 may output the forms as documents that include a text format, such as JSON or another suitable format.

Value extraction block 564 may receive the output of OCR block 563, and modify the documents to include line breaks based on the input Extraction Rules. Anchor finding block 565 may receive the document with lines breaks added from value extraction block 564, and may determine anchors based on the input extracted anchors. Feature generation block 566 may receive the modified forms, and may generate features from the forms. Machine Learning Module Interface block 567 may receive the features generated by feature generation block 566, and, based on those features and the key-value pairing model, generate preliminary key-value pairs. For example, through the key-value pairing model, block 567 may be able to make the determinations of preliminary key-value pairs based on position of text, position of text relative to other text, formats, such as particular fields expected to have certain numbers of particular types of characters, the presence of special characters, and/or the like.

After block 567 generates the preliminary key-value pairs, one or more bounding boxes may be re-OCRed by OCR block 563, and then run through blocks 564-567 again for increased accuracy. Next, in some examples, post-processing block 568 performs post processing to generate the key-value pairs. For instance, a particular key may have a possible value of "yes" or "no" which is indicated on the form by a checkbox which is left either checked or unchecked. In this case, the words "yes" or "no" as values for the key are not present as text in the form. However, during post processing, for example, the x in a particular location may be used to determine during post-processing by post-processing block 568 that the value of a corresponding key is "yes." The key-value pairs output by post-processing block 568, along with the OCRed form, may serve as the results of service pipeline 561. In testing pipeline examples as discussed above, the key-values may be received by evaluation block 569 for an accuracy determination.

Illustrative Process

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 6:
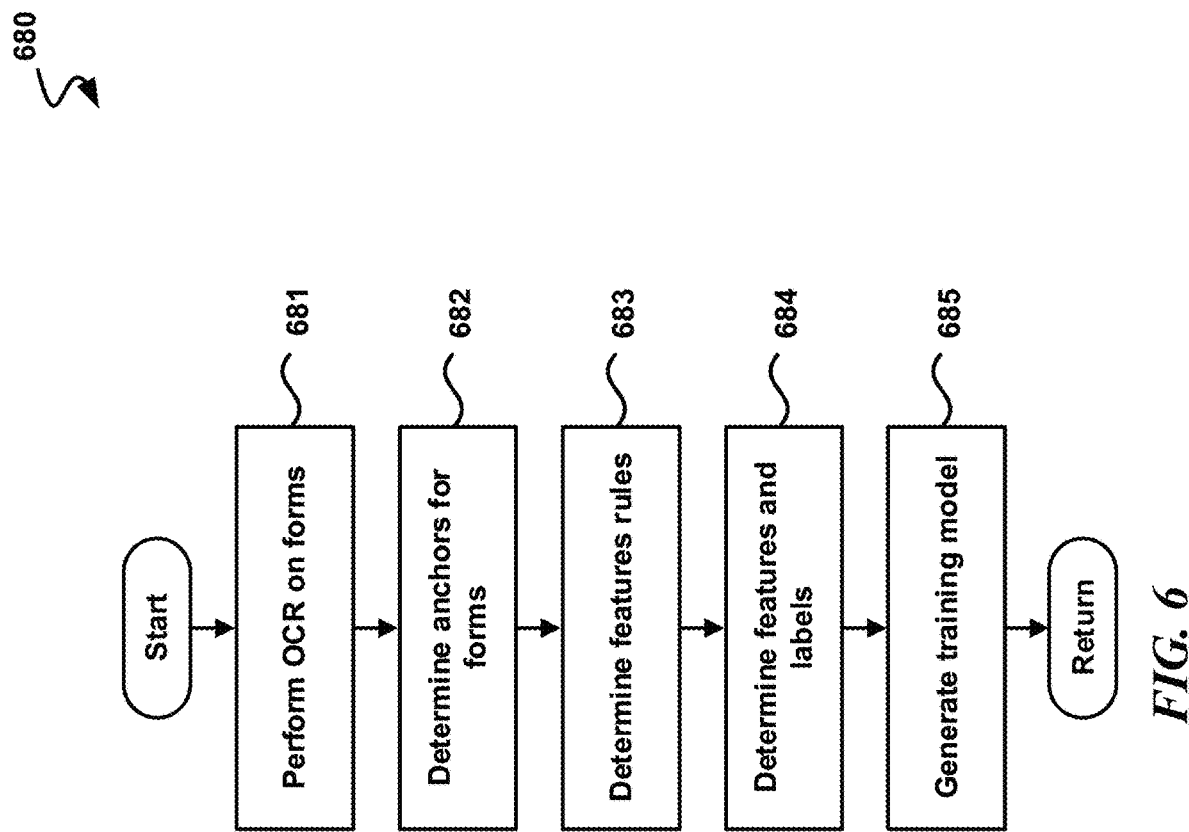
FIG. 6 is a flow diagram illustrating an example of a training process, in accordance with aspects of the present disclosure.

FIG. 6 illustrates an example dataflow for a process (680) for training. In some examples, process 680 is performed by a device, such as device 200 of FIG. 2, or system 300 of FIG. 3.

In the illustrated example, step 681 occurs first. At step 681, in some examples, optical character recognition is performed on a plurality of forms. In some examples, the forms of the plurality of forms include at least one type of form. As shown, step 682 occurs next in some examples. At step 682, in some examples, anchors are determined for the forms, including corresponding anchors for each type of form of the plurality of forms. As shown, step 683 occurs next in some examples. At step 683, in some examples, based on the plurality of rules and the ground truth, feature rules are determined, including corresponding feature rules for each type of form of the plurality of forms.

As shown, step 684 occurs next in some examples. At step 684, in some examples, features and labels are determined for each form of the plurality of forms. As shown, step 685 occurs next in some examples. At step 685, in some examples, a training model is generated based on a ground truth that includes a plurality of key-value pairs corresponding to the plurality of forms, and further based on the determined features and labels for the plurality of forms. The process may then proceed to the return block, where other processing is resumed.

Conclusion

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
    a device including at least one memory adapted to store run-time data for the device, and at least one processor that is adapted to execute processor-executable code that, in response to execution, enables the device to perform actions, including:
        performing optical character recognition on a plurality of forms, wherein the forms include forms of at least one type;
        for each type of form, determining anchors for that type of form, such that, for each type of form, the anchors for that type of form are visible form elements present at substantially the same physical location of each form of that type of form;

based on the plurality of forms and a ground truth, determining feature rules for each type of form;

determining features and labels for each form of the plurality of forms; and generating a training model based on the determined features and labels and on the ground truth, wherein the ground truth includes, for each form, at least one key-value pair associated with that form, wherein each key-value pair includes a key and a value, wherein the value includes a data item that includes text from the associated form, and wherein the key includes a data item that is linked to the value in that key-value pair as an identifier of the value in that key-value pair.

2. The apparatus of claim 1, the actions further including generating extraction rules based on the plurality of forms.

3. The apparatus of claim 1, wherein determining the anchors is based, at least in part on, for each line in the forms, how many forms in which the line appears, whether the line appears more than once per page, whether the line is part of the ground truth, and whether the line is a known good anchor.

4. The apparatus of claim 1, wherein determining the anchors is based on at least one designated empty form in the ground truth.

5. The apparatus of claim 1, the actions further including generating a language model based, in part, on the determined anchors.

6. The apparatus of claim 1, wherein generating the training model is based on machine learning.

7. The apparatus of claim 1, the actions further including parsing the plurality of forms after performing the optical character recognition.

8. The apparatus of claim 1, the actions further including modifying the plurality of forms based on line breaks, and generating extraction rules for the plurality forms based on the plurality of forms and the ground truth.

9. The apparatus of claim 1, wherein determining the feature rules includes using the ground truth to determine whether a field is a limited vocabulary field.

10. The apparatus of claim 1, wherein determining the feature rules includes using at least the ground truth to determine whether a field is in a fixed format.

11. A method, comprising:
generating extraction rules based on a plurality of forms, wherein the forms include forms of at least one type;

for each type of form, deriving anchors for that type of form, such that, for each type of form, the anchors for that type of form are visible form elements present at substantially the same physical location of each form of that type of form;

based on the plurality of forms and a ground truth, deriving feature rules for each type of form;

deriving features and labels for each form of the plurality of forms; and via at least one processor, employing machine learning to generate a training model based on the derived features and labels and on the ground truth, wherein the ground truth includes, for each form, at least one key-value pair associated with that form, wherein each key-value pair includes a key and a value, wherein the value includes a data item that includes text from the associated form, and wherein the key includes a data item that is linked to the value in that key-value pair as an identifier of the value in that key-value pair.

12. The method of claim 11, wherein deriving the anchors is based, at least in part on, for each line in the forms, how many forms in which the line appears, whether the line appears more than once per form, whether the line is part of the ground truth, and whether the line is a known good anchor.

13. The method of claim 11, wherein generating the training model is based on machine learning.

14. The method of claim 11, wherein deriving the feature rules includes using the ground truth to determine whether a field is a limited vocabulary field.

15. The method of claim 11, wherein deriving the feature rules includes using at least the ground truth to determine whether a field is in a fixed format.

16. A method, comprising:
performing training on forms of the types to be processed, the training being performed on a plurality of forms, wherein the forms include forms of at least one type, and a ground truth that includes, for each form, at least one key-value pair associated with that form, wherein each key-value pair includes a key and a value, wherein the value includes a data item that includes text from the associated form, and wherein the key includes a data item that is linked to the value in that key-value pair as an identifier of the value in that key-value pair, performing the training including:

performing optical character recognition on the forms;

generating extraction rules based on the forms;

for each type of form, determining anchors for that type of form, such that, for each type of form, the anchors for that type of form are visible form elements present at substantially the same physical location of each form of that type of form;

based on the plurality of forms and the ground truth, determining feature rules for each type of form;

determining features and labels for each form of the plurality of forms; and generating a training model based on the ground truth and the determined features and labels;

performing optical character recognition on an input form;

determining lines in the input form based on the extraction rules;

determining anchors on the input form based on the anchors;

determining features for the input form based on the feature rules; and determining key-value pairs for the input form based, at least in part, on the determined features for the input form and the training model.

17. The method of claim 16, wherein determining the anchors is based, at least in part on, for each line in the forms, how many forms in which the line appears, whether the line appears more than once per form, whether the line is part of the ground truth, and whether the line is a known good anchor.

18. The method of claim 16, wherein performing the training further includes generating a language model based, in part, on the determined anchors, and wherein performing optical character recognition on the forms is further based on the language model.

19. The method of claim 16, wherein determining the feature rules includes using the ground truth to determine whether a field is a limited vocabulary field.

20. The method of claim 16, wherein determining the feature rules includes using at least the ground truth to determine whether a field is in a fixed format.

\* \* \* \* \*